A. H. POHL.
GRASS AND THISTLE DIGGER.
APPLICATION FILED JULY 19, 1920.
1,430,583.
Patented Oct. 3, 1922.
2 SHEETS—SHEET 1.
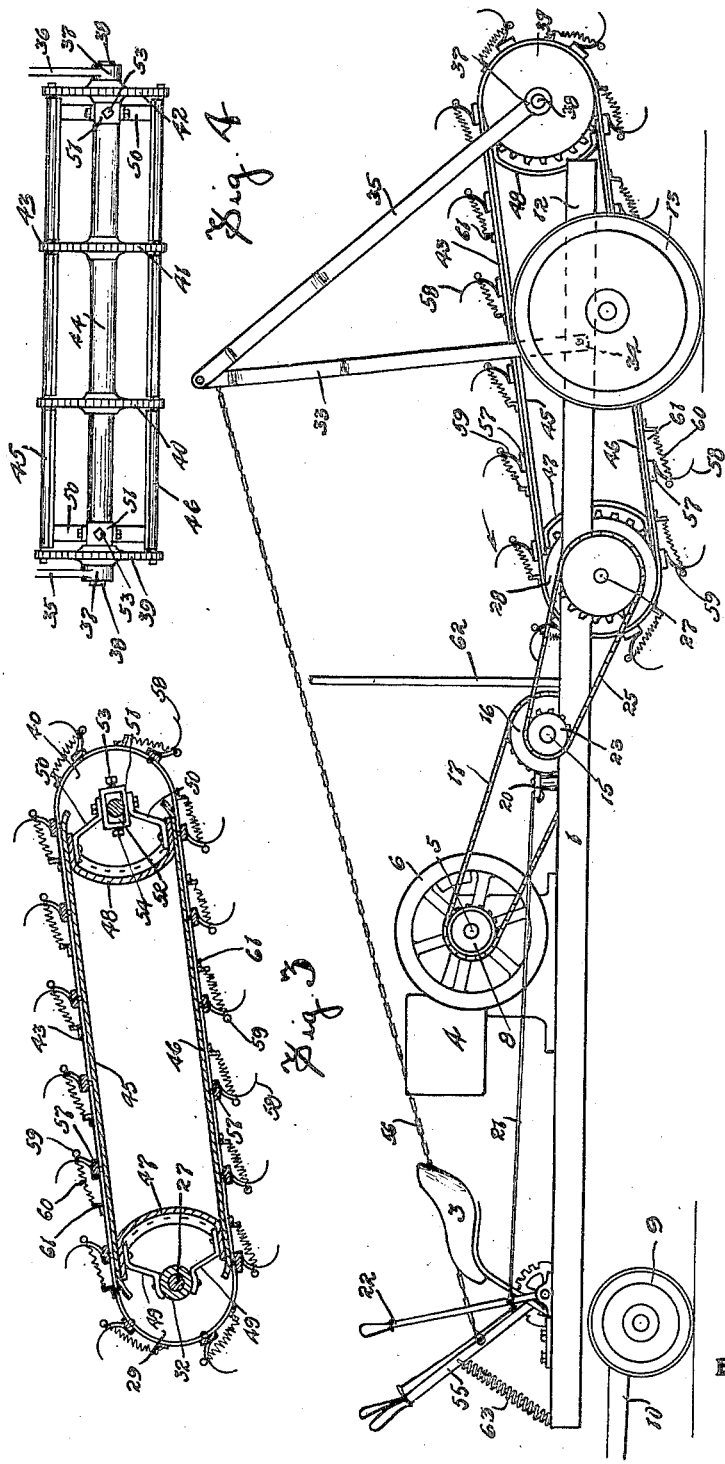
INVENTOR
A. H. Pohl
By
Attys

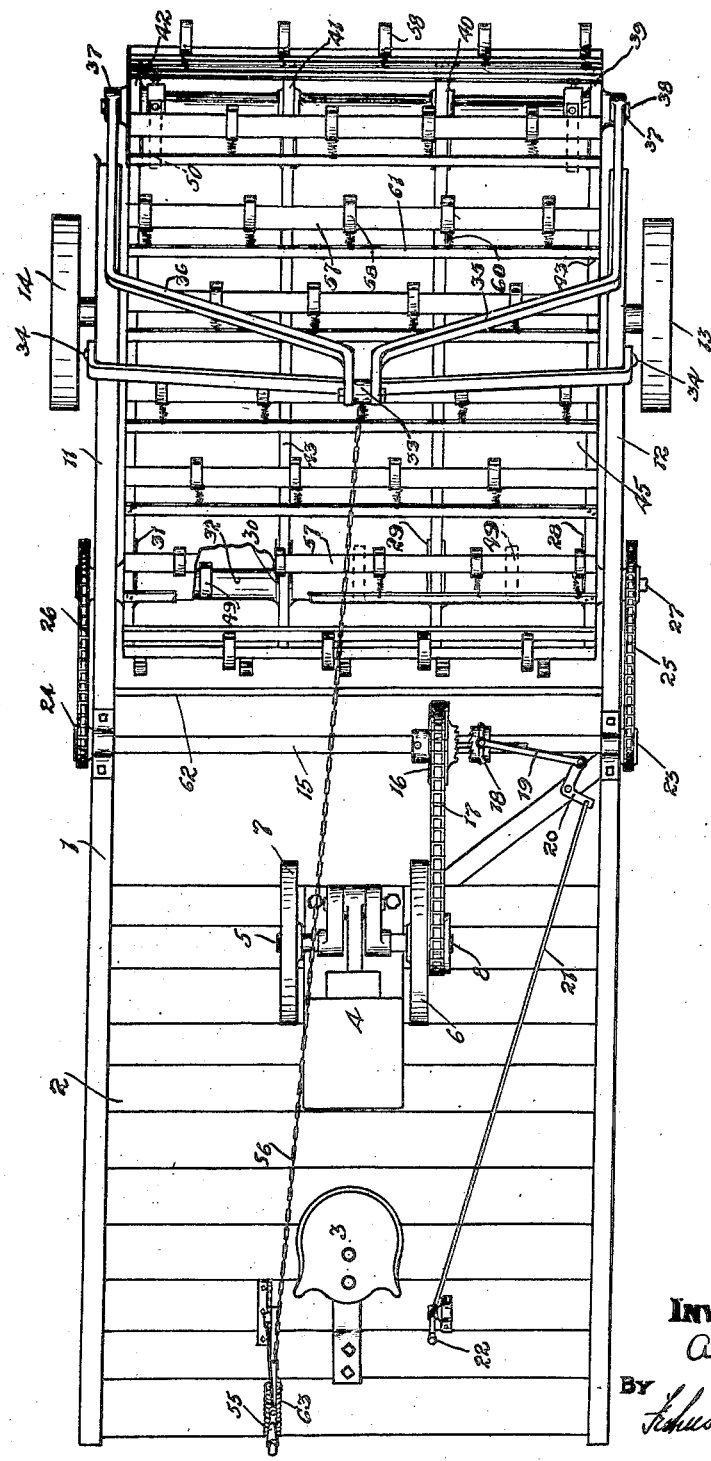

Patented Oct. 3, 1922.

1,430,583

UNITED STATES PATENT OFFICE.

ALBERT HENRY POHL, OF BERTON, MANITOBA, CANADA.

GRASS AND THISTLE DIGGER.

Application filed July 19, 1920. Serial No. 397,541.

*To all whom it may concern:*

Be it known that I, ALBERT HENRY POHL, of the village of Berton, in the Province of Manitoba, Canada, have invented certain new and useful Improvements in Grass and Thistle Diggers, of which the following is the specification.

The invention relates to improvements in grass and thistle diggers and the general object of the invention is to provide a farm implement which can be drawn over the field and which will effectively extract or dig weeds, particularly grass and sow-thistle as the machine advances, the digging being accomplished by a toothed conveyor like weeding mechanism driven at a comparatively high speed and adjustable towards and away from the ground as the operator desired.

A further object of the invention is to construct a large capacity machine driven by an engine mounted on the machine frame and arranged so that it can be steered by draft animals hitched to the front end of the machine.

A further object of the invention is to arrange the digging mechanism so that it can be controlled readily by the driver sitting at the front of the machine.

A still further object is to arrange the teeth of the digger so that they will be held to their work but can retract upon striking an obstacle such as a stone or root in the ground.

With the above more important objects in view the invention consists essentially in the arrangement and construction of parts hereinafter more particularly described and later pointed out in the appended claims, reference being had to the accompanying drawings in which:—

Fig. 1 is a side view of the complete machine.

Fig. 2 is a plan view thereof.

Fig. 3 is a sectional view longitudinally through the digging mechanism.

Fig. 4 is an end view of the digging mechanism with the chains removed.

In the drawings like characters of reference indicate corresponding parts in the several figures.

1 is a main frame provided forwardly with a platform 2 on which I mount the operator's seat 3 and an internal combustion engine 4 of any approved type, the engine driving shaft being indicated at 5 and being supplied with the customary fly wheels 6 and 7 and driving gear wheel 8. The front end of the frame is mounted on front steering wheels 9 and a draft tongue 10 controls the wheel. The rear end of the frame is open, the rearwardly extending ends of the side beams 11 and 12 thereof being mounted on rear ground wheels 13 and 14.

Directly to the rear of the engine I locate a counter shaft 15 which is supplied with a loose gear wheel 16 connected by means of a chain 17 to the gear 8. A clutch 18 is associated with the shaft and the wheel 16, the clutch being controlled by a bar 19 connected to a bell crank 20 which is connected by means of a rod 21 to a lever 22 mounted on the platform within convenient range of the driver's seat. Driving gear wheels 23 and 24 are located at the ends of the countershaft and these are fitted with side chains 25 and 26 which operate the digging mechanism now described.

27 is a front shaft suitably mounted in bearings secured to the undersides of the beams 11 and 12 and positioned parallel to the countershaft, the said shaft 27 being driven by the chains 25 and 26. To the shaft 27 and within the frame I secure four spaced chain wheels 28, 29, 30 and 31 and between the chain wheels and on the shaft I mount sleeves 32.

Rearwardly on the frame I provide an upstanding lever 33 which has the lower end forked and spanning the frame, the extremities of the forked ends of the lever being pivotally secured to the beams 11 and 12 as indicated at 34.

To the top end of the lever I connect pivotally the upper ends of a pair of rearwardly extending diverging lifting arms 35 and 36 the lower ends of which are formed into bearings 37 which receive rotatably a rear cross shaft 38.

On this cross shaft I also mount four spaced chain wheels 39, 40, 41 and 42 which are connected by means of endless chains 43 with the chain wheels 28, 29, 30 and 31 respectively.

On the shaft 38 I mount sleeves 44 positioned between the chain wheels. Immediately within the top and bottom sides of the chains I locate two plates 45 and 46, the plates having their front and rear ends connected by interposed arched cross plates 47 and 48.

The front ends of the plates 45 and 46 are supported within the chains by brackets 49 permanently secured to the plates and to the sleeves 32 and the rear ends of the plates are suspended by brackets 50 attached to guides 51 mounted on the shaft 38 and fitted with adjustable bearings 52 which carry the shaft 38.

From the above construction it will be apparent that the shaft 38 is held in spaced relation to the shaft 27 by the brackets and plates 45 and 46 and that the chains can be adjusted from time to time by manipulating the adjusting screws 53 and 54 of the rear bearings.

Forwardly on the machine I locate a controlling lever 55 supplied with the usual hand latch and detent operating over a quadrant. This lever is connected by a lifting chain 56 to the upper end of the lever 33. Obviously the lever 55 controls the position of the rear end of the weeding mechanism and a forward pull of the lever will raise the shaft 38, whilst a rearward swing will allow the shaft to drop towards the ground.

The chains 43 are fitted with suitably spaced cross slats 57 to which I secure in staggered relation on adjoining slats a plurality of hook like spring teeth 58, the inner ends of which are bolted to the slats. The spring teeth are reinforced by backing springs 59 and also by coil springs 60 which extend forwardly from the backing springs to cross bars 61 attached to the chain in a location somewhat in advance of the cross slats.

62 is a shield erected on the frame in advance of the digging mechanism.

In order to relieve the operator of the load when manipulating the lever 55 I secure a tension spring 63 to the lever and the frame which tension spring carries or is adapted to carry the greater part of the weight of the digger when the detent of the lever is released. Obviously this arrangement makes it easy for the attendant to adjust the lever.

Although I have shown a chain drive between the shaft 5 and that 15 I wish it to be understood that a train of gears could be utilized instead of the chain if a more positive drive be desired.

When the machine is to be used the engine is started and it is steered over the ground by the draft animals hitched to the tongue. When ready to work the attendant throws in the clutch and adjusts the lever 55 to allow the rear end of the digging appliance to contact with the ground.

The action of the moving teeth is to dig into the ground a predetermined distance and effectively tear up the surface of the soil, thereby extracting the grass and sow thistle and throwing them out at the back. It will be understood that the direction of rotation of the teeth is as indicated by the applied arrow Fig. 1 and that the teeth are rotated at a comparatively high speed by the engine.

When one is through working, the lever 55 is thrown to a position such as shown in Fig 1 which clears the teeth from the ground so that the machine can be readily drawn from place to place.

What I claim as my invention is:—

1. In a grass and thistle digger, the combination with a frame having the rear end open, wheels supporting the frame and an engine mounted forwardly of the frame, of a digging mechanism carried by and located within the open end of the frame and comprising a front shaft driven by the engine and carried by the sides of the frame, a body structure swung from the front shaft and embodying spaced parallel rearwardly extending top and bottom plates swung from the front shaft, a rotatably mounted rear shaft carried in forwardly and rearwardly adjustable bearings suspended from the rear ends of the plates, chain wheels mounted on the front and rear shafts, endless chains connecting the front and rear chain wheels, cross slats secured to the chains, hooked teeth extending from the cross slats and arranged in staggered relation and means for adjustably suspending the rear shaft from the main frame.

2. In a grass and thistle digger, the combination with a frame having the rear end open, wheels supporting the frame and an engine mounted forwardly of the frame, of a digging mechanism carried by and located within the open end of the frame and comprising a front shaft driven by the engine and carried by the sides of the frame, a body structure swung from the front shaft and embodying spaced parallel rearwardly extending top and bottom plates swung from the front shaft, a rotatably mounted rear shaft carried in forwardly and rearwardly adjustable bearings suspended from the rear ends of the plates, chain wheels mounted on the front and rear shafts, endless chains connecting the front and rear chain wheels, cross slats secured to the chains, hooked teeth extending from the cross slats and arranged in staggered relation, an upwardly extending forked lever pivotally secured to the rear end of the main frame, a pair of rearwardly and downwardly extending arms having their upper ends pivotally connected to the lever and their lower ends receiving the rear shaft, a lever adjustably mounted on the front end of the frame and a connection between the latter lever and the former lever.

3. A digging machine comprising a main frame, an endless digger carrier pivoted at one end to said frame, an elevating member having the lower end thereof pivoted to said main frame and the upper end connected to said carrier, and a lever operatively connected to said elevating member.

4. A digging machine comprising a main frame, an endless digger carrier pivoted at one end to said frame, an elevating member having its lower end pivotally secured to the frame in a location intermediate the ends of the carrier, an operating lever, and connections extending upon opposite sides of said elevating member from the upper end thereof and secured respectively to said carrier and operating lever.

5. A digging machine, comprising a frame, an endless digger carrier pivotally secured thereto, an elevating member having a bifurcated lower end straddling the frame and pivotally secured thereto, connecting links extending between the upper end of the elevating member and opposite sides of the carrier, and an operating lever connected to said elevating member.

6. A digging machine comprising a main frame, a shaft mounted in bearings carried by the frame and having spaced chain wheels supported thereon, freely revoluble sleeves surrounding said shaft between the chain wheels, a digger frame comprising upper and lower plates secured at one end to said sleeves, bearings carried between said plates at the opposite end thereof, a second shaft supported in said bearings and provided with spaced chain wheels opposing said first wheels, endless chains extending between the two sets of chain wheels and supported by said upper and lower plates, cross slats connecting said chains, teeth carried by said slats, and means for raising and lowering the digger frame.

7. An arrangement according to claim 6, in which the means for raising and lowering the digger frame comprised an elevating member having a lower bifurcated end straddling the main frame and pivotally secured thereto, links connected at one end to opposite sides of the free end of the digger frame, the opposite ends of said links converging inwardly and being secured to opposite sides of said elevated member above the bifurcated end of the latter, and an operating lever operatively connected with said elevating member.

8. A digging machine comprising a frame open at the rear end, a transverse driven shaft carried by the frame, a transverse digger shaft also carried by the frame rearwardly of said driven shaft and geared to the latter, chain wheels carried by said digger shaft within the sides of the frame, freely revoluble sleeves surrounding the digger shaft between said chain wheels, a digger frame carried at one end of said sleeves and supported thereby for vertical movement between the sides of the frame, a second digger shaft journalled in the free end of the digger frame, chain wheels carried by said second shaft, endless teeth carrying chains extending between the chain wheels of said digger shafts, and means for raising and lowering the free end of the digger frame.

Signed at Winnipeg, Man. this 24 day of June 1920.

ALBERT HENRY POHL.

In the presence of—
G. S. ROXBURGH,
K. B. WAKEFIELD.